Oct. 24, 1967   A. C. DANNETTELL   3,349,309
INDUSTRIAL TRUCK POWER CIRCUIT
Filed Dec. 4, 1964   3 Sheets-Sheet 1

INVENTOR
ALAN C. DANNETTELL

BY

ATTORNEY

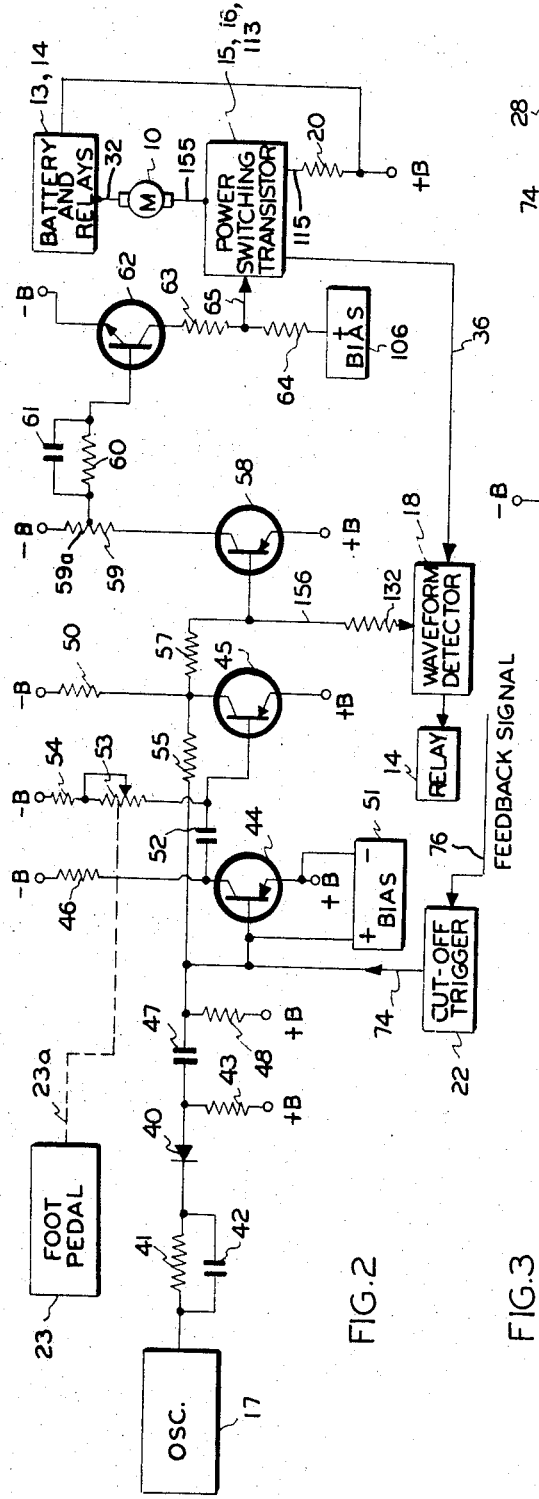
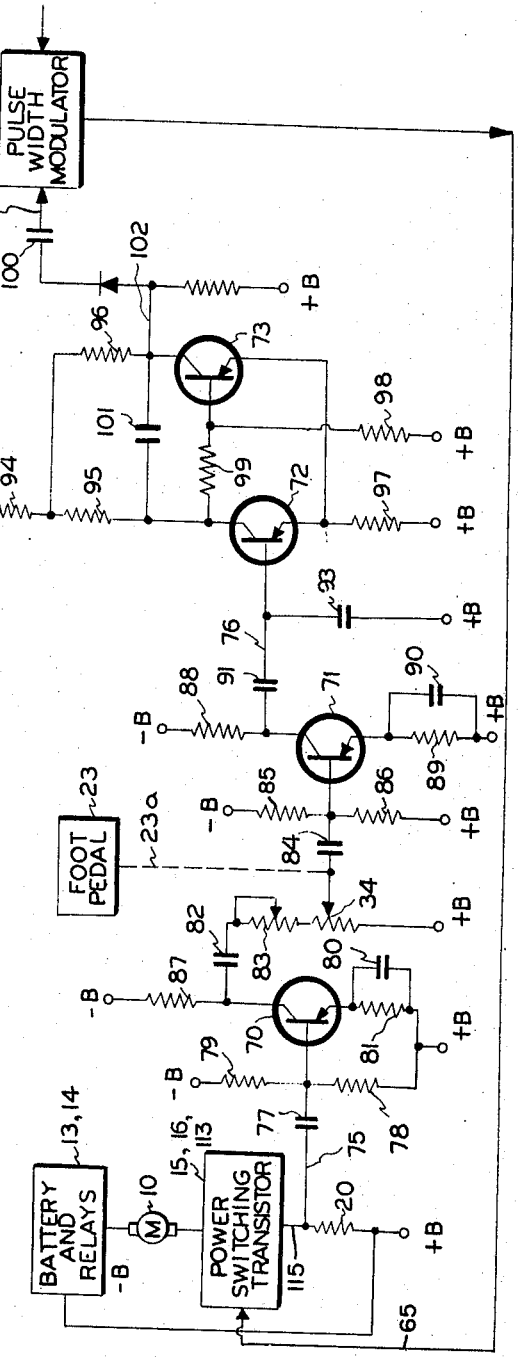

United States Patent Office 3,349,309
Patented Oct. 24, 1967

3,349,309
INDUSTRIAL TRUCK POWER CIRCUIT
Alan C. Dannettell, Philadelphia, Pa., assignor to Yale &
Towne, Inc., New York, N.Y., a corporation of Ohio
Filed Dec. 4, 1964, Ser. No. 415,974
13 Claims. (Cl. 318—341)

ABSTRACT OF THE DISCLOSURE

This is a transistorized pulse circuit for controlling the speed of an industrial truck, so designed that the control currents are applied as power to the traction motor, achieving better efficiency. A part of the circuit acts automatically to limit the motor current, but is adjusted by movements of the same foot pedal that controls speed, in effect removing the current limit at low speed, when the pulses are short, and allowing the driver to apply better control when inching the truck. As a protection feature the circuit will monitor the form of the pulse wave, disconnecting the system from the battery when the wave form indicates transistor failure.

Figure 1:
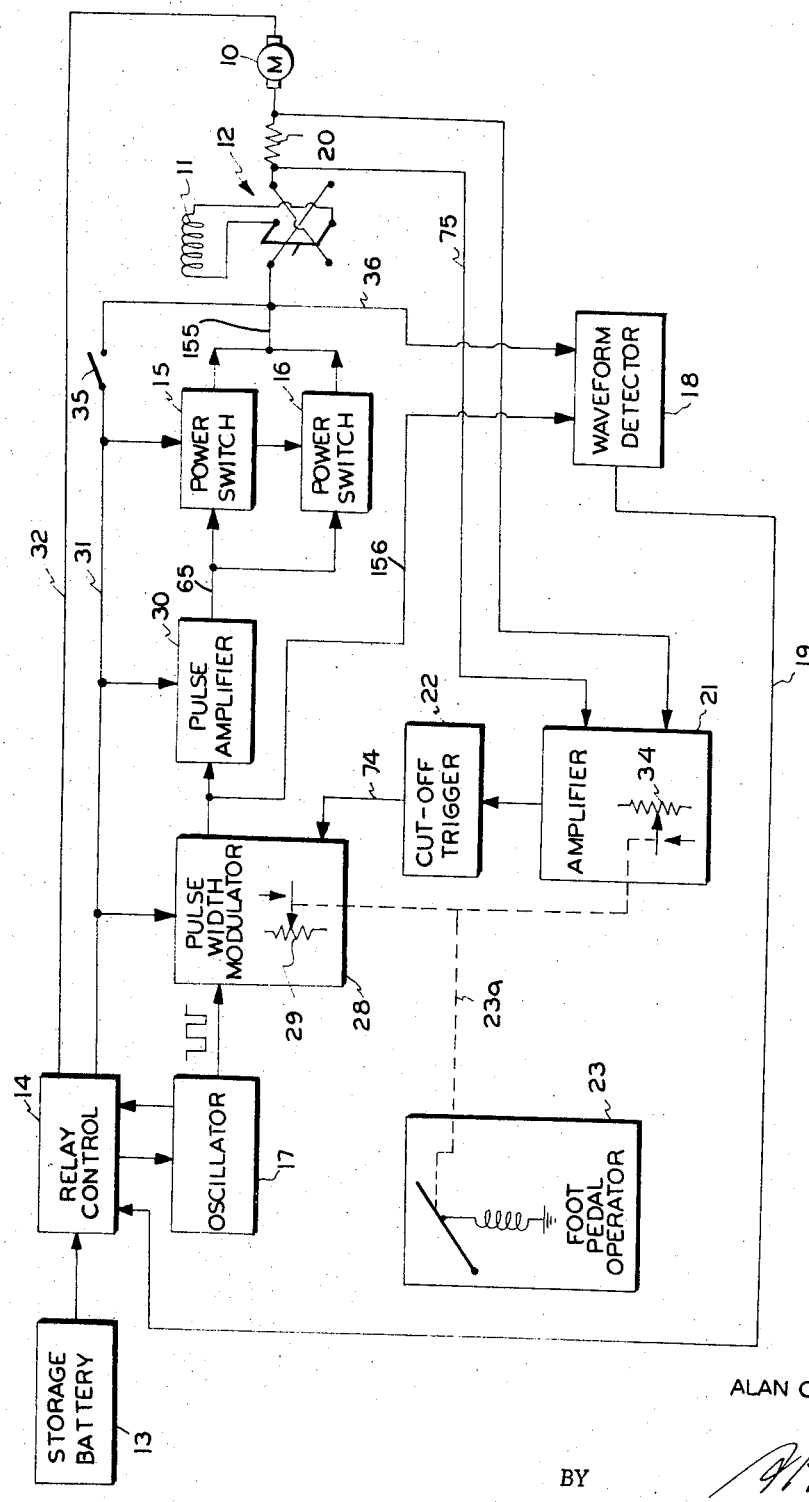

This invention relates to improvements in electrical motor control systems for industrial trucks, and is specifically directed to improvements in systems of the type providing varying duty cycle pulsing of a direct current traction motor from a storage battery to adjustably and precisely control the power applied to the motor.

In an earlier application S.N. 239,959, of the same assignee, now Patent No. 3,243,681, there is disclosed a solid state motor control system wherein the operator of the truck can adjustably regulate the time duration or duty cycle of direct current impulses applied to a series direct current traction motor by controlling the switching of a series of parallel connected power transistors interconnecting the battery and motor. In that system, there is provided current equalizing means for apportioning the motor current equally among the power transistors together with an automatically operating current limiting circuit for limiting the maximum current applied to the motor in direct proportion to the time duration or duty cycle of the impulses.

According to the present invention, there is provided a similar solid state motor control system having a number of new features to both improve the efficiency and performance of the system and provide added protection for the truck equipment and driver in the event of malfunction of one or more of the power transistors.

To improve the efficiency of the system, the motor control of the present invention provides a system that directs substantially all of the control currents as well as power currents to the motor so that an increased proportion of energy taken from the battery is applied for motor drive purposes.

To provide added protection of the truck and driver, the motor control system provides an automatically operating detector for monitoring the waveform of the battery current applied to the motor and automatically disconnecting the storage battery from the system upon detecting a short circuit of any one of the power transistors.

Additionally, to improve the performance of the truck while protecting the motor against overload, the system provides a novel "inverse" type of motor current limiting control that is coupled for adjustment by the driver's control pedal to effectively remove any automatic current limiting for short duty cycle pulses while imposing an appropriate current limit protection for longer duty cycle pulses. This control enables the motor to receive full stalled motor current and normal plugging currents while limiting the maximum current drawn under other conditions to within permissible limits.

It is accordingly a principal object of the invention to provide a direct motor control system for industrial trucks having improved efficiency, performance, and safety.

A further object is to provide such a system requiring less frequent charging of the truck storage batteries.

Another object is to provide such a system employing solid state transistor circuits and provided with automatic protection against transistor short circuits or malfunctioning.

Still another object is to provide such a system capable of manually directing operation over a wide range of conditions ranging from full stalled motor current and normal plugging currents to full speed in both forward and reverse drive, yet providing automatic regulation over the maximum motor current and protection against malfunctioning of the transistor circuits.

A still further object is to provide such a motor control system that may be disconnected by the driver to directly apply the storage battery to the motor in either the forward or reverse energized direction.

Figure 4:
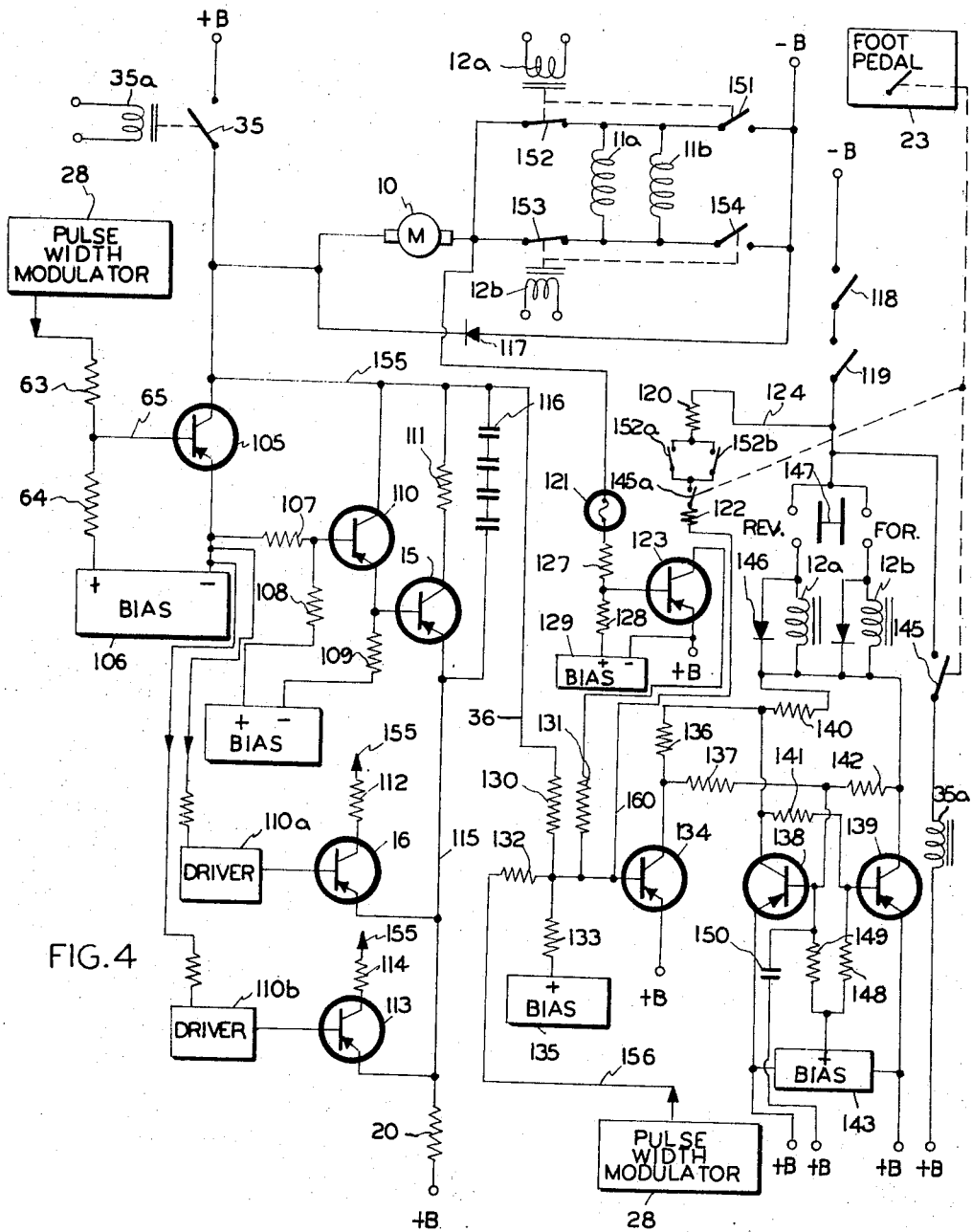

Other objects and additional advantages will be more readily understood by those skilled in the art after a detailed consideration of the following specification taken with the accompanying drawings wherein:

FIG. 1 is a block diagram schematically illustrating a preferred motor control system according to the invention, FIG. 2 is an electrical schematic diagram of the preferred transistor circuits for controlling the duty cycle switching of the power transistors, FIG. 3 is an electrical schematic diagram of the preferred transistor circuits for automatically limiting the maximum motor current inversely in proportion to the average voltage applied to the motor, and FIG. 4 is an electrical schematic diagram of the preferred power transistor switching circuits and the protection circuits for automatically disconnecting the storage battery in the event of short-circuiting of one or more of the power switching transistors.

Referring to FIG. 1 for a consideration of the overall system and its mode of operation, the electrical motor for driving the industrial truck is preferably a direct current traction motor 10 having series field windings 11 interconnected with the motor armature winding 10 by means of a reversing switch, as is schematically indicated at 12. A storage battery 13 for powering the motor 10 is interconnected with the system by means of control relays 14, and through a series of parallel connected high current capacity transistor power switches, indicated at 15 and 16. These transistor switches are adapted to be repetitively closed at the beginning of each cycle of a constant frequency oscillator 17 to apply discrete pulses of power from the battery 13 through the switches 15, 16 to the motor 10, and opened at an adjustable time during each cycle of the oscillator 17 as determined by the manual positioning of a driver's foot pedal 23, thereby to adjustably regulate the duty cycle or time duration of the power pulses applied to the motor.

To conduct the relatively large battery currents necessary to drive the truck traction motor 10, a relatively large number of such power switching transistors 15 and 16 are required, and in a preferred system a total of 16 of such transistors are used in parallel connection and are provided with current equalizing means for apportioning the current among these transistors.

A transistor may possibly fail by short-circuiting; and in the event that one or more of the power transistors 15, 16 should become short-circuited, the direct current voltage from the battery 13 would be constantly applied to the motor 10 through the shorted transistor causing the truck to accelerate to full speed and thereby creating a highly dangerous condition. According to the present invention, this hazard is minimized by the use of a waveform detecting circuit 18 that determines whenever a constant amplitude of direct current signal is applied to the motor or occurs in the system, and rapidly operates the relay controls 14 to disconnect the battery 13 from the motor control system if such malfunction should occur.

In addition to protecting the truck and driver against short-circuiting or malfunction of the transistor circuits, the system also incorporates means for automatically limiting the amplitude of battery current applied to the motor in inverse proportion to the average pulsed voltage applied to the motor 10. Thus when the truck is traveling at a low speed or is at rest, the full stalled motor current and normal plugging currents can be applied to the motor through the switching system without any current limiting action being imposed, whereas when the truck is traveling at moderate and higher speeds, an automatic current limit is progressively imposed to prevent an excessive current flow that could burn-out or otherwise overload the motor. This automatic current limiting control is provided by a feedback circuit including a resistor 20 in series with the motor 10 which detects the amplitude of the motor current during each power pulse, a feedback amplifier 21 that amplifies this feedback signal, and a cut-off triggering circuit 22 that is operated whenever the amplified feedback signal reaches a given level to automatically terminate the duty cycle pulsing of the motor and thereby reduce the motor current. To provide the desired "inverse" type of control, the gain of the feedback amplifier 21 is adjusted in inverse proportion to the displacement of the driver's foot pedal 23, thereby to lower the gain of the feedback amplifier 21 and remove any limiting current action at lower speeds of the motor, and conversely to increase the gain and progressively impose a desired current limit at the higher speeds.

Returning to FIG. 1 and tracing the operation of the overall system, the oscillator 17 is energized by the storage battery 13 to produce a regular succession of constant waveform square wave shape pulses. Each oscillator pulse triggers a pulse width modulator 28 into operation for a variable time duration as controlled by an adjustable potentiometer 29 that is positioned by the displacement of the driver's foot pedal 23. At the end of this adjustable time interval, the modulator 28 terminates its pulse and is automatically reset in preparation for receiving the next trigger from the oscillator 17. When the driver's foot pedal 23 is depressed at a minimum displacement, the time constant of the modulator 28 is adjusted by potentiometer 29 to provide a minimum time constant and the pulse from the modulator 28 is automatically terminated almost immediately after the pulse is initiated, whereas when the foot pedal 23 is displaced to a maximum position, the time constant of this modulator trigger 28 is increased to the point of terminating the modulator pulse just shortly before the next trigger or next cycle of the oscillator 17. Consequently, the time duration or duty cycle of the modulator pulses are adjustable over a complete range extending from almost full "on" to full "off" under control of the driver's foot pedal 23.

These variable time duration pulses produced by the modulator 28 are preamplified in intensity, and then further amplified by an amplifier 30 to a level that is sufficient to operate the switching of the high current power switching transistors 15, 16. Thus at the beginning of each cycle of the oscillator 17, all of the power switching transistors 15, 16 are operated to pass the battery current over lines 31 and 32 and through the high current switching transistors 15, 16 to the motor 10; and at the termination of each modulator pulse, the power transistors 15, 16 are deenergized to terminate the power pulse applied to the motor 10.

For automatically controlling the current limit applied to the motor, the motor current is sampled during the application of each power pulse by the series resistor 20, and the signal developed across this resistor 20 is applied in feedback to the amplifier 21. In the event that the amplified signal from amplifier 21 reaches a sufficient level, it operates a cut-off trigger circuit 22 to apply a feedback pulse over line 74 to the modulator 28 for terminating the operation of the modulator in advance of its normal period. As noted above, the amplified pulses from the modulator 28 control the operation of the transistor power switches 15 and 16, and consequently when the modulator 28 receives a feedback terminating pulse from the cut-off trigger 22, the power switching transistors 15, 16 are extinguished to terminate the duty cycle of battery current applied to the motor.

As is known to those skilled in the art, a series direct current traction motor draws current in proportion to the voltage applied to the motor, whereby shortening the duty cycle of power applied to the motor also reduces the current drawn by the motor to within a permissible limit.

As discussed above, the present invention provides an adjustment of this automatic current limiting control in a manner "inversely" to the speed of the truck. This is performed by interconnecting the driver's foot pedal 23 through a suitable linkage 23a to position a gain control potentiometer 34 located in the feedback amplifier 21. For minimum displacement of the driver's pedal 23 (low speed or at rest) the gain of the feedback amplifier 21 is sufficiently reduced to effectively disable the automatic current limiting control circuit. On the other hand, as the driver's foot pedal 23 is depressed toward a position of maximum displacement (high speed) the gain of the amplifier 21 is progressively increased by the potentiometer 34 to impose current limits for each speed at the desired levels. In this manner, when the truck is at rest or is moving slowly, the full amplitude of stalled current or plugging current may be applied to the motor as is desired, whereas when the truck is traveling at different speeds an automatic current limiting control is imposed to prevent an excessive current flow to the motor.

The power pulses being applied to the motor 10 from the storage battery 13 through the switching transistors 15, 16 normally have the same square waveform as do the pulses produced by the modulator unit 28, since the transistor power switches 15, 16 are operated during the time period of each pulse from the modulator 28. To protect against short-circuiting of any of the power transistors 15, 16 the waveform of the power pulses applied to the motor 10 are compared with the square waveform being produced by the pulse width modulator circuit 28 by means of a waveform detector circuit 18, and upon a constant direct current signal being detected from either signal, the detector 18 produces a disconnect signal over line 19 to the relays 14 for disconnecting the storage battery 13 from the system.

In the event that the trunk driver wishes to bypass the motor control system and to apply full storage battery power to the motor 10, the system also provides suitable bypass switches, generally indicated at the upper right of FIG. 1 by switch 35, for bypassing switching transistors 15, 16 and directly connecting the battery power lines 31 and 32 to the motor 10.

In FIGS. 2, 3 and 4, the terminals of battery 13 are indicated by the letter B.

Referring to FIG. 2 for the preferred transistor circuitry employed as the pulse width modulator 28 and the preamplifier and pulse amplifier circuit 30, the square waveshape pulses from the oscillator 17, being produced at a preferred frequency of about 400 cycles per second, are applied to a diode 40 through a resistor capacitor network, consisting of resistor 41 and capacitor 42, which performs both a coupling and wave shaping function. The diode 40 is reversely poled so that only the negative going portions of the squarewave signals may pass therethrough and be applied across a resistor 43, These negative portions are directed through a coupling circuit, including a capacitor 47 and resistor 48, to the base electrode of transistor 44.

The transistor 44 is interconnected in feedback with transistor 45 to provide a monostable multivibrator or retriggerable delay flop, having a controllably variable time delay. The collector of transistor 44 is connected through a resistor 46 to the negative terminal of the battery 13 and the emitter of this transistor is connected to the positive terminal of the battery. Similarly, the collector electrode of transistor 45 is interconnected with the negative terminal of the battery by resistor 50 and the emitter electrode is energized by the positive terminal. A suitable bias source 51 is provided between the base and emitter electrodes of transistor 44 to normally bias this transistor in a nonconducting condition.

The circuitry interconnecting the two transistors 44 and 45 in feedback comprises a timing circuit including a capacitor 52, a variable resistor 53 and a fixed resistor 54 interconnecting the collector of transistor 44 to the base of transistor 45. A feedback resistor 55 interconnects the collector of transistor 45 in feedback to the base of transistor 44.

Considering the operation of this circuit, the transistor 44 is biased by 51 under steady state conditions to be in the nonconductive or "off" condition and the transistor 45 to be normally conductive or "on." Upon receiving a negative going impulse from the oscillator 17 at the base of transistor 44, the transistor 44 becomes conducting, thereby producing a positive impulse at its collector which is transmitted through the capacitor 52 to the base of transistor 45. This positive pulse changes the transistor 45 from a conducting condition to a nonconducting condition and produces a negative going impulse at its collector and backwardly through the resistor 55 to the base of transistor 44 to continue transistor 44 in a conducting state.

As transistor 44 conducts, a current flows from the positive terminal of the battery through the emitter and collector electrodes of transistor 44, and thence through the capacitor 52 and the resistors 53 and 54 to the negative terminal of the battery. This current flow progressively charges the capacitor 52 with its lefthand terminal becoming increasingly positive with the passage of time and at a rate of proportional to the time constant of the capacitor 52 and resistors 53 and 54. Consequently after a period of time proportional to the time constant of this resistor-capacitor circuit, the capacitor 52 charges to a sufficiently positive potential to extinguish the conduction of transistor 44 which in turn commences the conduction of transistor 45 and resets the circuit to its initial condition. Thus, a negative pulse received at the base of transistor 44 reverses the conducting, non-conducting condition of the transistors 45 and 44 for a period of time proportional to the time constant of capacitor 52 and resistors 53 and 54 and after a period of time the circuit reverts to its initial condition. During the operation of this circuit, the transistor 45 is rendered non-conducting and a negative impulse is produced at the collector electrode and transmitted via resistor 57 to the base electrode of preamplifier 58.

For controlling the time duration of the pulse produced by this multivibrator, the operator's foot pedal 23 is suitably interconnected by a linkage 23a to adjust the value of potentiometer 53 in the time constant circuit. Thus as the operator depresses his foot pedal 23, the resistor 53 in the time constant circuit is increased to increase the time duration or pulse width produced by this modulator circuit 28.

The transistor 58 receiving the negative pulse of variable duration from the modulator 28, functions as a preamplifier to amplify the negative pulse and applies the amplified pulse to the junction of resistors 59 and 59a in the collector circuit. This amplified pulse is passed through the resistor 60 and capacitor 61, provided as a waveshaping network, and is directed to the base electrode of transistor 62 operating as a power amplifier that responds to the pulse and provides a power amplified pulse over line 65, FIGS. 2 and 4, to operate the power switching transistors 15, 16 and 113.

The power amplifying stage comprising transistor 62 employs an opposite conductivity type transistor having a pair of resistors 63 and 64 in its collector circuit and connected to positive bias 106. The emitter electrode of transistor 62 is directly connected to a negative terminal of the battery. The amplified modulator pulse is applied to the base electrode of transistor 62 and is power amplified to a level sufficient to operate the power switching transistors 15, 16.

As discussed above, this power amplified pulse is sufficient to turn "on" or render conducting the power switching transistors 15, 16 which, in turn, interconnect the storage battery 13 to the motor 10, thereby applying the power impulses from the battery to the motor. The switching transistors 15, 16 are rendered conductive for the period of time of the modulator pulse and upon the termination of the modulator pulse the power switching transistors 15, 16 are extinguished to terminate the power pulse applied to the motor.

It will be appreciated by those skilled in the art from the foregoing description, that the above sequence of operations occurs during each cycle of the oscillator 17 whereby a series of discrete power pulses are applied to the motor 10 from the storage battery 13 at the frequency of the oscillator 17, and with the individual impulses of said series being of variable duration as controlled by the setting of the operator's foot pedal 23.

For supplying the bias potentials 51 and 65 and for producing the oscillator signal 17, a combined DC to DC voltage converter is preferably employed, and one preferred circuit thereof is disclosed in the earlier application referred to above. It will be appreciated by those skilled in the art, however, that other conventional oscillators and direct current biasing means may be used for these same purposes.

FIG. 3 illustrates the preferred transistor circuit for providing the automatic current limiting control for the motor 10. As shown, the sensing resistor 20 provided in series with the power switching transistors 15, 16, and the motor 10, receives a current proportional to the motor load current and accordingly provides a voltage across this resistor 20 proportional to the amplitude of the current pulses being applied to the motor. The resistor 20 for this purpose may be of very small resistance value but capable of carrying the large motor currents and a conventional meter shunt has been found to be satisfactory.

The pulsed voltage across resistor 20 is directed through line 75 to a pair of cascaded transistor stages, consisting of transistors 70 and 71, which serve the function of a class A amplifier, to amplify the motor current signal and provide an amplified output signal over line 76. This amplified output signal is thence directed to a Schmitt trigger circuit consisting of transistors 72 and 73, that produce an output pulse over line 74 whenever the amplified motor current signal is of sufficient amplitude to operate the Schmitt trigger. The Schmitt trigger circuit is shown in block diagram form in both FIG. 1 and FIG. 2 and labeled the "cut-off trigger" 22 and; as shown in FIG. 2, the signal therefrom is directed in feedback over line 74 to the base of transistor 44 in the pulse width modulator circuit 28.

Considering this circuit in greater detail, the motor current pulses appearing across resistor 20 are directed over line 75 and through coupling capacitor 77 to the base of the first amplifier stage transistor 70. The base of transistor 70 is biased by connection to the junction of series connected resistors 78 and 79 which are energized across the positive to negative terminals of the battery. The first stage transistor 70 is also self-biased to a proper level by means of a resistor-capacitor network 81 and 80 in its emitter circuit, and its collector is energized by a resistor 87 connected to the negative terminal of the battery.

From the collector circuit of transistor 70, the motor current pulse signal is directed through a coupling capacitor 82 to a pair of series connected variable resistors or potentiometers including potentiometer 83 and the potentiometer 34 that was mentioned in connection with FIG. 1. Resistor 83 is adjustable to provide an initial setting of the gain of the amplifier stage, and potentiometer 34 is interconnected with the driver's foot pedal 23 by a mechanical linkage 23a to enable the driver to control the gain of the amplifier in "inverse" proportion to the displacement of the foot pedal.

The second stage of amplification, and including transistor 71, is substantially identical to the first stage. Thus, potentiometer 34 directs pulses through coupling capacitor 84 to the base of transistor 71, and that base is biased by connection to the junction of series connected resistor 85 and 86 which are energized across the positive and negative terminals of the battery. Further, transistor 71 is self-biased through a resistor-network 89 and 90, there also being a resistor 88 through which the collector of transistor 71 is energized. Transistor 71 provides an output signal over line 76 to the Schmitt trigger circuit, comprising transistors 72 and 73.

Transistor 72 is normally biased into conducting condition by connection of its base to the junction of capacitors 91 and 93 that are interconnected in series with resistor 88 between the positive and negative terminals of the battery. Consequently the base of transistor 72 receives a proper potential to render this transistor normally conducting. The second transistor 73 of the Schmitt trigger 22 has its collector electrode connected through resistor 96 to the junction of the series connected resistors 94 and 95 in the collector circuit of transistor 72. The emitter of transistor 73 is directly connected to the emitter of transistor 72 and, in turn, through resistor 97 to the positive terminal of the battery. A resistor 99 interconnects the collector of transistor 72 to the base of transistor 73 in the forward direction, and a feedback capacitor 101 interconnects the collector electrode of transistor 73 to the collector electrode of transistor 72. A resistor 98 connects the base of transistor 73 to the positive battery terminal.

As indicated above, the transistor 72 is normally in a conducting condition, and the transistor 73 is normally nonconducting due to the fact that its base is connected through resistor 99 to the more positive potential of the collector of conducting transistor 72. Upon receiving an impulse of sufficiently positive amplitude from the second stage amplifier 71, the transistor 72 is rendered nonconducting and, in turn, applies the more negative potential at its collector electrode to the base of transistor 73, changing transistor 73 to a conducting condition. As transistor 73 conducts, the capacitor 101 is progressively charged by current passing through resistors 94, 95, capacitor 101, transistor 73, and resistor 97. This charge potential is in such direction as to extinguish conduction of transistor 73 after a fixed period of time when the voltage across capacitor 101 reaches a sufficient level thereby to reset the circuit to its initial condition with transistor 72 conducting and transistor 73 nonconducting.

In recapitulation, the voltage across resistor 20 proportional to motor current is amplified by the transistor stages 70 and 71, and the amplified signal is applied to the Schmitt trigger circuit including transistors 72 and 73. The gain of these amplifier stages is controlled by the setting of potentiometer 34 which in turn is interconnected for "inverse" change by the driver's foot pedal. Consequently, as the driver depresses the foot pedal 23 to apply a greater average pulsed voltage to the motor, the gain of the feedback amplifier 21 is progressively increased so that a progressively lower amplitude of motor current through resistor 20 is sufficient to trigger the Schmitt trigger circuit 22 into operation. On the other hand, when the foot pedal 23 is not depressed, or is depressed only slightly, the gain of the feedback amplifier 21 is maintained at a very low level so that the automatic current control system is substantially ineffective.

Upon the motor current signal being of sufficient amplitude to operate the feedback circuit, the Schmitt trigger 22 produces a positive pulse over line 102 which passes through the coupling capacitor 100 and over line 74 to the pulse width modulator 28. As shown in FIG. 2, this positive feedback pulse is applied directly to the base of transistor 44 and extinguishes the conduction of this transistor to reset the modulator 28 and terminate its pulse. As will be recalled, this shortens the time duration of operation of the pulse width modulator and, in turn, extingushes the power switching transistors 15, 16 thereby reducing the power pulse applied from the battery to the motor. Consequently, the operation of the automatic current limit control circuit as described results in reducing the duration of the power pulse applied to the motor 10 and, in turn, reducing the average current applied to the motor. This described feedback process is repeated with each pulse applied to the motor until the sensing resistor 20 determines that the current to the motor 10 no longer exceeds the level that has been predetermined. When this happens, the current feedback signal applied to the Schmitt trigger 22 is of insufficient amplitude to operate this trigger 22 and the pulse width modulator 28 operates for its normal period unaffected by the current limit control.

FIG. 4 illustrates details of a preferred power switching circuit for applying the impulses of power from the battery 13 to the motor 10, and additionally illustrates a preferred circuit for disconnecting the battery 13 upon a short-circuit or malfunction occurring in the power transistors.

As shown the amplified pulses from modulator 28 and amplifier 30 are taken from the junction of resistors 63 and 64 and are applied to the base of transistor 105 that functions as a single stage amplifier to operate all of the power switching transistors. Normally, transistor 105 is suitably biased by source 106 to be nonconducting and upon receiving a negative impulse from the amplifier 30, is rendered conducting during the negative pulse to permit current flow from its collector to emitter electrodes. This current flow passes through resistor 107 to the base of a driver transistor 110. The base of that transistor is biased through a resistor 108, but the current flowing through resistor 107 will switch the driver transistor 110 to a conducting condition. The driver transistor 110 is, in turn, interconnected to pass current to the base of power switching transistor 15. The base of that transistor is biased through a resistor 109, and when the driver transistor 110 is rendered conducting, it operates the switching transistor 15. Thus upon receiving each amplified pulse from the modulator 28, the further amplifying transistor 105, driver transistor 110, and power switching transistor 15 are all made conducting and pass current from their collector to emitter electrodes.

As shown, the power switching transistor 15 is disposed with its collector to emitter electrodes in a series circuit between lines 155 and 115, and therefore it is disposed in series between the motor 10 and storage battery terminals +B, −B. Tracing this circuit, current flows from the positive terminal of the battery through the current sensing resistor 20, over line 115, through power switching transistor 15, through a current balancing resistor 111, and thence over line 155 to the motor 10 and ultimately to the negative terminal of the battery. A commutating capacitor 116 is connected around transistor 15 and resistor 111. Thus, whenever switching transistor 15 is rendered conducting, the battery current is passed to the motor 10 as previously noted.

A series of additional power switching transistors, including transistors 16 and 113, are interconnected in parallel with transistor 15 across lines 115 and 155, all to supply the battery current to the motor. Each of these additional transistors is also provided with a driver transistor indicated at 110a, 110b, that is similar to and connected in the same manner as is the driver transistor 110 to power transistor 15. All of these driver transistors are energized in unison by the amplifier transistor 105, in the same manner as described above, to operate their associated power switching transistors 16 and 113 and others in unison for switching the battery current to the motor.

To limit the current carried by each of the power transistors 15, 16, and 113; and to insure that the current load is equally apportioned among these power transistors, the resistor 111, along with current limiting resistors 112, and 114 are arranged in series with each of these power switching transistors. As is disclosed in said earlier application referred to above, a series of mutually coupled transformer windings may alternatively be employed for current equalizing purposes to apportion the load current equally among the power transistors.

The preferred power switching circuitry of the present invention is considerably more efficient than that previously proposed in that all of the battery current used for control purposes by the driver transistors, such as 110, and the amplifier transistor 105 is applied to the motor 10 together with the power pulses passed by the power switching transistors.

Tracing the control current flow through the circuitry to the motor, it is noted that the collector electrodes of the amplifier transistor 105 and the driver transistors 110, 110a, and 110b are all connected to line 155, leading to one terminal of the motor 10. In the amplifying transistor 105, the current flow between the collector and emitter electrodes is passed to the base of driver transistor 110 and the other drivers 110a and 110b, and thence passes from the emitters of these driver transistors to the bases of the power switching transistors 15, 16, and 113 and thence to the emitters of these to line 115 leading to the positive terminal of the battery. Similarly, the current between the collector and emitter of the driver transistors, such as transistor 110, is also passed through the base to emitter electrodes of the power switching transistors 15, 16, and 113 to the same line 115. Additionally, as noted above all of the collector-emitter currents of the power switching transistors 15, 16, and 113 are directed to the motor 10. Thus it is seen that all current flow through the amplifier 105, driver transistors 110, 110a, and 110b, and power switching transistors 15, 16, and 113 is applied to the motor 10 is perform useful work.

FIG. 4 also illustrates the preferred circuitry for automatically disconnecting the battery in the event of a short circuit or malfunction in any one or more of the power switching transducers including 15, 16, 113. As shown, this function is provided by a flip-flop circuit including transistors 138 and 139, and by a waveform detecting transistor 134.

In the flip-flop circuit, the transistor 139 is normally conducting and the transistor 138 is nonconducting, and current flow through the conducting transistor 139 energizes either the forward relay winding 12b or the reverse relay winding 12a depending upon the direction of closure of the operator's reversing switch 147. The additional series connected switches 118 and 119 are normally closed during the operation of the truck; the switch 118 being an ignition key operated switch, and switch 119 being a seat operated switch that is closed when the driver is seated in the truck.

By tracing this series circuit of FIG. 4, it is seen that upon all of these switches being closed, current flows from the positive terminal of the battery through the normally conducting transistor 139 and through one or the other of the relay coils 12a or 12b to the negative terminal of the battery. To achieve better operation, a diode 146 is connected around each relay coil 12a, 12b.

As shown at the upper portion of FIG. 4, the relay windings 12a and 12b operate the relay switches 151 and 152, and 153 and 154, respectively, that serve to interconnect the series motor windings 11a and 11b with the motor armature 10 and negative terminal of the battery.

For operation of the truck in the forward direction, the driver operated switch 147 is positioned to the right to energize the relay 12b which, in turn, closes the contact 154 and opens the contact 153. This places the motor windings 11a and 11b in circuit with the negative terminal of the battery through contact 154 and with the armature 10 of the motor through normally closed contact 152. Similarly, upon positioning of the driver's switch 147 to the left, or in the reverse direction, the relay winding 12b is deenergized and the relay winding 12a is energized to close contact 151 and open contact 152, and thereby connect the motor windings 11a and 11b in the opposite polarity direction between the motor armature and battery. A diode 117 provides an alternate path which will enable current to flow through the motor 10 during the time interval between the power pulses, as in my earlier application to which I have referred.

According to the present invention, the waveform detecting circuit compares the waveform from the pulse width modulator 28 with the waveform of the power pulses applied to the motor 10 to determine whenever a constant direct current is produced by either waveform, indicating a malfunction, to deenergize the relays 12a or 12b and disconnect the battery 13 from the motor 10.

This detection function is performed by the transistor 134. As shown, the signal from the pulse width modulator 28 is applied over line 156 and through resistor 132 to the base of transistor 134. Similarly, the power pulses applied to the motor, and appearing on line 155, are also applied through a line 36 and resistor 130 to the base of transistor 134. The power pulses on lines 155 and 36 are one hundred and eighty degrees out of phase from those of the pulse width modulator 28 so that during normal operation the base of transistor 134 always receives a negative potential from one or the other of these pulsed waveforms and is accordingly maintained conducting. The base of transistor 134 is also connected through a resistor 133 to a positive bias 135. The transistor 134 is therefore normally conducting and applies a positive potential through resistor 137 to the base of flip-flop transistor 138 to normally maintain the transistor 138 nonconducting and the transistor 139 conducting. The collector circuit of transistor 134 is connected through resistor 136 to the collector circuit of transistor 138, and further through resistor 140 to the collector circuit of transistor 139. The bases of transistors 138, 139 are connected through resistors 149, 148 to a positive bias 143, and the base of transistor 138 is connected through a capacitor 150 to the positive terminal of battery 13. The base of transistor 139 is connected through resistor 141 to the collector circuit of transistor 138, while the base of transistor 138 is connected through resistor 142 to the collector circuit of transistor 139.

A voltage that is first applied to this system will cause the transistor 139 to conduct, and capacitor 150 will momentarily hold transistor 138 in nonconducting condition. Transistor 139 then will hold transistor 138 nonconducting until a strong signal is applied through transistor 123 to make transistor 138 conduct. A positive bias 129 is applied through resistor 128 to the base of transistor 123. When the power circuit is energized, a strong negative signal will act through the motor field windings 11a, 11b, and through the fuse 121 and resistor 127 to the base of transistor 123, causing that transistor to apply a positive signal through resistor 131 to the base of transistor 134. Thereafter, the transistor 134 will be normally controlled by the waves coming from pulse width modulator 28 and power switches 15, 16 and 113 through the resistors 130, 177

In the event that the negative pulses applied by either the pulse width modulator 28 or the power switches 15, 16, and 113 should be discontinued, indicating a short circuit or malfunction of the circuit, the positive bias on transistor 134 renders this transistor nonconducting. Upon transistor 134 being rendered nonconducting, a negative potential from its collector element is transmitted through resistor 137 to the base of transistor 138, reversing the condition of the flip-flop circuit and rendering transistor 138 conducting and transistor 139 nonconducting. As noted above, whenever transistor 139 is rendered nonconducting, the control relays 12a or 12b are deenergized to disconnect the battery from the motor. Thus, upon the transistor 134 detecting a short circuit condition in the power switching transistors or malfunction in the pulse width modulator 28, it operates to reverse the state of flip-flop transistors 138 and 139 and disconnects the battery from energizing the motor.

In the event that the driver wishes to disconnect the motor control system and to apply the full battery potential to the motor, he may do so by fully depressing his foot pedal control 23 to its maximum position. This closes a switch 145, shown at the right of FIG. 4, and applies the battery potential to a relay 35a. The energizing of relay 35a, closes its contact 35, shown at the upper left hand portion of FIG. 4, to thereby apply the positive terminal of the battery directly to the motor armature 10.

When the driver by-passes the motor control by closing switch 145, it is necessary that the control relay 12a or 12b remain energized so as to maintain either of contacts 151 or 154 closed in the motor circuit, as discussed above. This function is performed by disabling the waveform detecting circuit and maintaining the transistor 139 constantly conducting.

To disable the waveform detecting circuit, a companion switch 145a is interconnected with switch 145 to be closed when the truck driver depresses his foot pedal 23 to its ultimate position. Switch 145a is connected in series with resistors 122 and 120, and with the alternately closed parallel connected contacts 152a and 153a of relays 12a and 12b, respectively. When switch 145a is closed it applies the negative battery potential from line 124 through these resistors 120 and 122 and closed contacts 152a or 152b to line 160. This negative potential on line 160 to the base of transistor 134 is sufficient to continuously render transistor 134 conducting and this, in turn, maintains transistor 139 conducting to maintain the relay 12a of relay 12b energized, as is desired.

Although but one preferred embodiment of the invention has been illustrated and described, it is believed evident to those skilled in the art that many changes and variations may be made without departing from the spirit and scope of this invention. Accordingly this invention is to be considered as being limited only by the following claims.

What is claimed is:

1. In a battery powered motor control system for controlling an electric traction motor to drive an industrial truck, said system having pulse producing means energized by the battery for producing a regular succession of power pulses to energize said motor, manually operated means for varying the time duration of said pulses to control the energization of said motor, and current limit control means responsive to an increasing amplitude of current through the motor for automatically reducing the time duration of the power pulses; the improvement that comprises a part of said current limit control means operable to adjust those means so as to offer no response while the current amplitude substantially increases to that of a full stalled motor current, and means through which the manually operated means while reducing the time duration of the pulses will so operate said part to adjust the limit control means, in effect removing a current limit and allowing the manually operated means full control of the motor current.

2. A battery powered electrical drive for industrial trucks comprising: a traction drive motor, an oscillator for producing a regular succession of control impulses, power pulse producing means energized by the battery and actuated in response to said control impulses to apply power pulses to the motor at the same frequency as said control impulses, and disabling means for comparing the waveforms of said oscillator means and power pulse producing means and disconnecting said battery from the motor control system in the event of a malfunction in the power pulse producing means.

3. A motor control system for industrial trucks driven by an electrical series motor and powered by a storage battery comprising: oscillator means for producing a regular succession of control pulses, modulator means responsive to said control pulses for producing time duration modulated impulses, power means responsive to said modulated impulses for interconnecting the battery to the motor during the duration of said modulated impulses, current limit control means responsive to the amplitude of current to the motor exceeding a preset level for automatically reducing the time duration of said modulated pulses, manually controlled means for jointly controlling said modulator means and said current limit control means in inverse proportion thereby to proportionally increase the current limit while reducing the time duration of the modulated pulses and the reverse, and disconnect means responsive to the modulator means and to said power means to automatically disconnect the battery upon a malfunction in the power means.

4. In an industrial truck driven by a direct current series motor and powered by a succession of variable duration impulses from a storage battery, circuit means energized by the battery for producing said impulses at constant frequency and at adjustable time durations, manually operable means for said circuit means for adjusting the time duration of said impulses to vary the power delivered to the motor, current limit control means responsive to the amplitude of current to said motor during said pulses exceeding a preset amplitude for automatically reducing the time duration of said impulses, means interconnecting said manually operable means and said current limit control means to adjustably vary said preset amplitude in inverse proportion to the adjustment in time duration of said impulses, manually operated means for reversing the energization of said motor to reverse the direction of movement of the truck, manually operated by-pass means for by-passing said circuit means and continuously applying said battery to energize said motor, disconnect means responsive to said circuit means for detecting a cessation of impulses from said circuit means to disconnect the battery from the circuit means, and means responsive to said manually operated by-pass means for disabling said disconnect means.

5. A motor control system for switching discrete power pulses from a storage battery to a direct current motor to control an industrial truck comprising: control means energized by said battery to repetitively interconnect the battery to the motor, said control means including a plurality of electronic switching means interconnected in parallel with one another between said battery and motor and with each electronic switching means being capable of passing only a present maximum amplitude of current, and automatic means for detecting a short circuit in any one of said switching means to disconnect the battery from said switching means.

6. In the system of claim 5, said automatic means comprising means responsive to the waveform of current directed to said motor to detect a continuous current component.

7. A control system for applying discrete impulses of current from a storage battery to a traction motor to control an industrial truck comprising: a plurality of electronic switching means interconnected in parallel with one another and applying power from said battery to said motor, each of said switching means being capable of passing only a portion of the total current to said motor, means for periodically operating said switches in unison to apply discrete impulses of current to said motor, and automatically operating means for determining whenever a continuous current is directed to said motor indicating a short circuit in one of said switching means for disconnecting the battery from said switching means.

8. A storage battery powered motor control system for controlling an electrical traction motor to drive industrial trucks comprising: battery powered oscillator means for producing a regular succession of constant waveform pulses at constant frequency, modulator means triggered by each oscillator pulse at the beginning of each pulse to produce an adjustable time interval impulse, transistor power switching means energized by said modulator means to apply the full potential of the storage battery to said motor for the entire time interval of said modulator pulses, feedback means responsive to the current flow to said motor exceeding a given amplitude for terminating said modulator pulse in advance of its normal period, manual control means for adjusting said given amplitude, a second manual control means for adjusting said modulator means to vary the time interval of said modulator pulses, said first and second manual control means being interconnected for joint actuation in inverse proportion by a single actuator whereby as the time interval of said modulator pulses are increased said given amplitude is decreased and the reverse, and disconnect means jointly responsive to said transistor power switching means and said modulator means to disconnect the storage battery from the control system and motor in the event of malfunction of either the switching means or the modulator means.

9. In the system of claim 8, selectively operable manually controlled by-pass means for applying the storage battery to the motor for continuous operation, said by-pass means including means for disabling said disconnect means.

10. In the system of claim 9, said transistor power switching means comprising a plurality of power transistors, current equalizing means in circuit with said power transistors, and said disconnect means detecting a short circuit in any one of said plurality of power transistors.

11. In a motor control system for industrial trucks having an electrical traction motor and powered by a storage battery, a power switching circuit comprising a power switching transistor having base, collector, and emitter electrodes, with the collector and emitter electrodes thereof in series circuit between the storage battery and motor, a driver transistor having base, collector, and emitter electrodes with the collector and emitter electrodes thereof connected between the base electrode and one of the other electrodes of the power switching transistor, an amplifier transistor having base, collector, and emitter electrodes with the collector and emitter electrodes thereof being connected between the base electrode of the driver transistor and that electrode of the driver transistor that is not connected to the base electrode of the power switching transistor, the interconnections between the amplifier transistor, the driver transistor, and the switching transistor directing all base current, emitter current, and collector currents of said interconnected transistors to the motor, and means for producing and applying duration modulated impulses to the base electrode of the amplifier transistor, thereby to render all of said transistors conducting in unison and apply energization to said motor.

12. In the system of claim 11, a plurality of said power switching transistors, a plurality of said driver transistors with one driver transistor for each power transistor, means interconnecting the collector and emitter electrodes of said power switching transistors in parallel circuit connection, and means coupling the collector and emitter electrodes of each driver transistor to a different one of said power switching transistors.

13. In a motor control system for industrial trucks having an electrical traction motor and powered by a storage battery, a power switching transistor having base, collector, and emitter electrodes, with the collector and emitter electrodes thereof being coupled in series circuit with the motor and battery, a driver transistor having base, collector, and emitter electrodes with the collector electrode and emitter electrodes thereof being coupled to the base electrode of the power switching transistor to apply current flow thereto, an amplifier transistor having base, collector, and emitter electrodes with the collector and emitter electrodes being coupled to the base electrode of the driver transistor to apply current flow thereto, whereby substantially all current flow through the amplifier, driver, and power switching transistors is directed to said motor.

References Cited
UNITED STATES PATENTS

| | | | |
|---|---|---|---|
| 3,214,666 | 10/1965 | Clerc | 318—331 X |
| 3,223,909 | 12/1965 | Sensing et al. | 318—139 |
| 3,243,681 | 3/1966 | Dannettell | 318—341 X |

ORIS L. RADER, *Primary Examiner.*

J. J. BAKER, *Assistant Examiner.*